(12) United States Patent
Claesson et al.

(10) Patent No.: US 7,160,947 B2
(45) Date of Patent: Jan. 9, 2007

(54) POLYMERS AND LAUNDRY DETERGENT COMPOSITIONS CONTAINING THEM

(75) Inventors: Per Martin Claesson, Stockholm (SE); Petrus Wilhelmus Nicolaas de Groot, Vlaardingen (NL); Donna MacNab, Bebington (GB); Albert van der Wal, Bebington (GB); Becky Zhou, Bebington (GB)

(73) Assignee: Unilever Home & Personal Care USA division of Conopco, Inc., Greenwich, CT (US)

( * ) Notice: Subject to any disclaimer, the term of this patent is extended or adjusted under 35 U.S.C. 154(b) by 0 days.

(21) Appl. No.: 10/735,376

(22) Filed: Dec. 11, 2003

(65) Prior Publication Data

US 2004/0127391 A1    Jul. 1, 2004

(30) Foreign Application Priority Data

Dec. 13, 2002 (GB) ................. 0229147.4

(51) Int. Cl.
*C08L 51/00* (2006.01)
*C11D 3/37* (2006.01)

(52) U.S. Cl. .............. 525/89; 525/118; 525/158; 525/326.9; 510/475; 510/476

(58) Field of Classification Search .......... 525/326.9, 525/326.7, 118, 85, 158; 510/475, 476
See application file for complete search history.

(56) References Cited

U.S. PATENT DOCUMENTS

| | | | |
|---|---|---|---|
| 3,557,039 A | | 1/1971 | McIntyre et al. ......... 260/29.2 |
| 3,985,700 A | * | 10/1976 | Nicks et al. ................ 524/457 |
| 4,444,561 A | | 4/1984 | Denzinger et al. ............. 8/137 |
| 4,579,681 A | * | 4/1986 | Ruppert et al. ............. 510/299 |
| 4,846,994 A | | 7/1989 | Kud et al. ............. 252/174.21 |
| 5,783,616 A | | 7/1998 | Krause et al. ................ 524/58 |
| 6,025,320 A | * | 2/2000 | Appel et al. ................ 510/444 |
| 6,075,107 A | * | 6/2000 | Kothrade et al. ........... 526/264 |

FOREIGN PATENT DOCUMENTS

| | | |
|---|---|---|
| DE | 2 165 898 | 7/1973 |
| DE | 21 65 834 | 7/1973 |
| DE | 32 06 883 | 9/1983 |
| DE | 37 11 229 | 10/1988 |
| EP | 001 305 | 4/1979 |
| EP | 262 945 | 4/1988 |
| EP | 403 062 | 12/1990 |
| EP | 271 312 | 5/1996 |
| EP | 786 517 | 7/1997 |
| EP | 876 819 | 11/1998 |
| EP | 957 156 | 11/1999 |
| EP | 874 892 | 4/2000 |
| EP | 1 019 476 | 2/2003 |
| GB | 1 354 498 | 5/1974 |
| GB | 1 467 098 | 3/1977 |
| GB | 1 536 136 | 12/1978 |
| GB | 2 043 082 | 10/1980 |
| GB | 1 602 420 | 11/1981 |
| WO | 91/00302 | 1/1991 |
| WO | 92/18597 | 10/1992 |
| WO | 94/03567 | 2/1994 |
| WO | 94/06354 | 3/1994 |
| WO | 94/24249 | 10/1994 |
| WO | 95/03390 | 2/1995 |
| WO | 95/17496 | 6/1995 |
| WO | 95/27028 | 10/1995 |
| WO | 95/34627 | 12/1995 |
| WO | 97/03166 | 1/1997 |
| WO | 97/20021 | 6/1997 |
| WO | 97/42285 | 11/1997 |
| WO | 99/09359 | 2/1999 |
| WO | 03/044146 | 5/2003 |

OTHER PUBLICATIONS

PCT International Search Report in a PCT application PCT/EP 03/12823.
PCT International Search Report in a PCT application PCT/EP 03/12797.
Derwent Abstract of WO 99/09359—published Feb. 25, 1999.
GB Search Report in a GB application GB 0229147.4—Jun. 30, 2003.
Derwent Abstract of WO 99/09359—Feb. 25, 1999.
Derwent Abstract of WO 97/03166—Jan. 30, 1997.
Derwent Abstract of WO 94/24249—Oct. 27, 1994.
Derwent Abstract of DE 2 165 898—Dec. 31, 1971.
Co-pending Application:Applicant:Macnab et al., U.S. Appl. No. 10/734,756; Filed: Dec. 11, 2003.

* cited by examiner

*Primary Examiner*—James J. Seidleck
*Assistant Examiner*—Olga Asinovsky
(74) *Attorney, Agent, or Firm*—Rimma Mitelman

(57) ABSTRACT

Graft copolymers providing soil release benefits in laundry detergent compositions contain backbone units derived from an ethylenically unsaturated monomer, hydrophilic uncharged side chains, and cationically chargeable or charged side chains containing a tertiary or quaternary nitrogen atom. Preferred copolymers have a methacrylate backbone with polyethylene oxide and 2-dimethylaminoethyl methacrylate (DMAEMA) side chains. The graft copolymers may be prepared by radical polymerisation.

15 Claims, No Drawings

POLYMERS AND LAUNDRY DETERGENT COMPOSITIONS CONTAINING THEM

TECHNICAL FIELD

The present invention relates to laundry detergent compositions containing certain graft copolymers. The compositions exhibit improved soil release, especially of oily soil from cotton fabrics, during the wash.

BACKGROUND AND PRIOR ART

Laundry detergent compositions containing soil release polymers, which assist the release of soil from fabrics during the laundry process, have been widely disclosed in the art.

Polyesters of terephthalic and other aromatic dicarboxylic acids, in particular, the so-called PET/POET (polyethylene terephthalate/polyoxyethylene terephthalate) and PET/PEG (polyethylene terephthalate/polyethylene glycol) polyesters, are known to have soil release properties. Such polyesters are disclosed, for example, in U.S. Pat. No. 3,557,039 (ICI), GB 1 467 098, EP 1305A and EP 271 312B (Procter & Gamble). Sulphonated polyesters having soil release properties are disclosed in EP 874 892A, EP 977 827A, EP 1 019 476A, and EP 1 012 512A (Unilever).

The mechanism of action for many soil release polymers is that a polymeric layer is deposited on the fibres and modifies their surface so that subsequent soiling is deposited on and adheres to the polymeric layer rather than the fibres themselves. Removal of the soil during the next wash is thus greatly facilitated. Alternatively some polymers may assist release of soil directly from the fibres.

While improved release of soil from synthetic fabrics such as polyester has been successfully achieved, especially with the so-called PET/POET type of polymer, the effective release of soils, especially oily soils, from cotton has proved much more difficult.

WO 97 42285A discloses soil release polymers for cotton comprising a polyamine backbone and quaternary ammonium cationic groups. While substantivity to cotton is good, these materials have been found to give some negatives, notably staining of the laundered fabrics. The presence of anionic surfactants also interferes with the action of the polymers because of their high density of positive charge.

There remains a need in the art to identify soil release polymers that give good substantivity to cotton without other detrimental properties.

DEFINITION OF THE INVENTION

The present invention provides a graft copolymer having a molecular weight of at least 10 000 comprising:
(a) backbone units derived from an ethylenically unsaturated monomer,
(b) hydrophilic uncharged side chains, and
(c) cationically chargeable or charged side chains containing a tertiary or quaternary nitrogen atom.

The invention also provides a process for the preparation of the graft copolymer.

The present invention further provides a laundry detergent composition comprising an organic surfactant, and a graft copolymer as defined in the previous paragraph, in an amount effective to improve soil release.

The invention further provides the use of a graft copolymer as defined above in a laundry detergent composition to promote the release of soil from textile fabrics during laundering.

DETAILED DESCRIPTION OF THE INVENTION

The novel graft copolymers of the invention, when incorporated in a laundry detergent composition, have been found to give significantly improved release of oily soil from cotton fabrics even in a low-temperature (30° C.) wash.

The Graft Copolymer

The graft copolymer of the present invention comprises:
(a) backbone units derived from an ethylenically unsaturated monomer,
(b) hydrophilic uncharged side chains,
(c) cationically chargeable or charged side chains containing a tertiary or quaternary nitrogen atom.

The backbone units (a) are preferably units derived from an ethylenically unsaturated carboxylate. More preferably the backbone units (a) are methacrylate units.

Suitably the backbone comprises from 10 to 100 units, more preferably from 20 to 60 units.

The hydrophilic uncharged side chains (b) preferably have a chain length of at least 6 carbon atoms, more preferably at least 10 carbon atoms.

The units (b) are most preferably polyethylene oxide chains. Preferably the polyethylene oxide chains comprise at least 3, and more preferably at least 6, ethylene oxide units. Advantageously they comprise at least 20, and most preferably at least 30, ethylene oxide units.

Without wishing to be bound by theory, it is believed that the polymer forms a layer which in the wash liquor has a thickness of at least 5–10 nanometers but which collapses on drying and re-swells during the next wash. This property of re-swellability is believed to be due to the presence of the uncharged hydrophilic side-chains which should be at least of a certain length.

The function of the cationically chargeable or charged side chains (c) is to bond with the cotton surface.

Preferably the units (c) are units of an ethylenically unsaturated monomer containing an aliphatic or aromatic moiety which contains a tertiary or quaternary nitrogen atom.

More preferably the units (c) are units of a tertiary amine acrylate or methacrylate which may optionally be wholly or partially quaternised.

Especially preferred are units of 2-dimethylaminoethyl methacrylate (DMAEMA) which may optionally be wholly or partially quaternised.

Thus the preferred graft copolymers comprise
(a) backbone units of methacrylate,
(b) polyethylene oxide side chains, and
(c) side chains of 2-dimethylaminoethyl methacrylate (DMAEMA).

Suitably the graft copolymer comprises a total from 70 to 99 mole %, preferably from 75 to 98 mole %, of the backbone units (a) and hydrophilic uncharged units (b); and from 1 to 30 mole %, preferably from 2 to 25 mole %, of the cationically charged or chargeable units (c).

The units (c) may optionally be wholly or partially in quaternised form. However, the wholly unquaternised form appears to give the best results.

The graft copolymer has a number average molecular weight of at least 10 000, preferably from 50 000 to 1 000 000, more preferably from 100 000 to 500 000. The polymer preferably has a weight average molecular weight of at least 20 000, preferably from 100 000 to 2 000 000, more preferably from 200 000 to 1 000 000.

Especially preferred are polymers having number average molecular weights of from 100 000 to 200 000 and weight average molecular weights of from 200 000 to 600 000.

Preparation of the Graft Copolymers

The graft copolymer of the invention may suitably be prepared by a process which comprises reacting (i) a copolymer having backbone units derived from an ethylenically unsaturated monomer and hydrophilic uncharged side chains with (ii) a monomer containing cationically chargeable or charged side chains containing a tertiary or quaternary nitrogen atom, in the presence of a free radical initiator.

For the preferred graft copolymers described above, the A process comprises reacting polyethylene glycol methyl ether methacrylate (PEGMA) with a tertiary amine acrylate or methacrylate which may optionally be wholly or partially quaternised, most preferably 2-dimethylaminoethyl methacrylate (DMAEMA).

The Laundry Detergent Composition

In the detergent composition of the invention, the polymer is present in an amount sufficient to provide enhanced soil release. Suitably the polymer is present in an amount of from from 0.1 to 10 wt %, preferably from 0.25 to 5 wt %.

The detergent composition may suitably comprise:

(a) from 5 to 60 wt %, preferably from 10 to 40 wt %, of organic surfactant, (b) optionally from 5 to 80 wt %, preferably from 10 to 60 wt %, of detergency builder, (c) from 0.1 to 10 wt %, preferably from 0.25 to 5 wt %, of the graft copolymer, (d) optionally other detergent ingredients to 100 wt %.

The Organic Surfactant

The compositions of the invention may contain any organic surfactants (detergent-active compounds) suitable for incorporation into laundry detergent compositions.

Detergent-active compounds (surfactants) may be chosen from soap and non-soap anionic, cationic, nonionic, amphoteric and zwitterionic detergent-active compounds, and mixtures thereof. Many suitable detergent-active compounds are available and are fully described in the literature, for example, in "Surface-Active Agents and Detergents", Volumes I and II, by Schwartz, Perry and Berch. The preferred detergent-active compounds that can be used are soaps and synthetic non-soap anionic and nonionic compounds. The total amount of surfactant present is suitably within the range of from 5 to 60 wt %, preferably from 5 to 40 wt %.

Anionic surfactants are well-known to those skilled in the art. Examples include alkylbenzene sulphonates, particularly linear alkylbenzene sulphonates having an alkyl chain length of $C_8$–$C_{15}$; primary and secondary alkylsulphates, particularly $C_8$–$C_{20}$ primary alkyl sulphates; alkyl ether sulphates; olefin sulphonates; alkyl xylene sulphonates; dialkyl sulphosuccinates; and fatty acid ester sulphonates. Sodium salts are generally preferred.

Nonionic surfactants that may be used include the primary and secondary alcohol ethoxylates, especially the $C_8$–$C_{20}$ aliphatic alcohols ethoxylated with an average of from 1 to 20 moles of ethylene oxide per mole of alcohol, and more especially the $C_{10}$–$C_{15}$ primary and secondary aliphatic alcohols ethoxylated with an average of from 1 to 10 moles of ethylene oxide per mole of alcohol. Non-ethoxylated nonionic surfactants include alkylpolyglycosides, glycerol monoethers, and polyhydroxyamides (glucamide).

Cationic surfactants that may be used include quaternary ammonium salts of the general formula $R_1R_2R_3R_4N^+X^-$ wherein the R groups are long or short hydrocarbyl chains, typically alkyl, hydroxyalkyl or ethoxylated alkyl groups, and X is a solubilising anion (for example, compounds in which $R_1$ is a $C_8$–$C_{22}$ alkyl group, preferably a $C_8$–$C_{10}$ or $C_{12}$–$C_{14}$ alkyl group, $R_2$ is a methyl group, and $R_3$ and $R_4$, which may be the same or different, are methyl or hydroxyethyl groups); and cationic esters (for example, choline esters).

The Optional Detergency Builder

Preferably, the detergent compositions of the invention also contain one or more detergency builders. The total amount of detergency builder in the compositions may suitably range from 5 to 80 wt %, preferably from 10 to 60 wt %.

Preferred builders are alkali metal aluminosilicates, more especially crystalline alkali metal aluminosilicates (zeolites), preferably in sodium salt form.

Zeolite builders may suitably be present in a total amount of from 5 to 60 wt %, preferably from 10 to 50 wt %.

The zeolites may be supplemented by other inorganic builders, for example, amorphous aluminosilicates, or layered silicates such as SKS-6 ex Clariant.

The zeolites may be supplemented by organic builders, for example, polycarboxylate polymers such as polyacrylates and acrylic/maleic copolymers; monomeric polycarboxylates such as citrates, gluconates, oxydisuccinates, glycerol mono-, di- and trisuccinates, carboxymethyloxysuccinates, carboxymethyloxymalonates, dipicolinates, hydroxyethyliminodiacetates, alkyl- and alkenylmalonates and succinates; and sulphonated fatty acid salts.

Alternatively, the compositions of the invention may contain phosphate builders, for example, sodium tripolyphosphate.

Especially preferred organic builders are citrates, suitably used in amounts of from 1 to 30 wt %, preferably from 2 to 15 wt %; and acrylic polymers, more especially acrylic/maleic copolymers, suitably used in amounts of from 0.5 to 15 wt %, preferably from 1 to 10 wt %. Builders, both inorganic and organic, are preferably present in alkali metal salt, especially sodium salt, form.

According to a preferred embodiment of the invention, the detergency builder, which is present in an amount of from 5 to 80 wt %, preferably from 10 to 60 wt %, is selected from sodium tripolyphosphate, zeolites, sodium carbonate and mixtures thereof.

Other Detergent Ingredients

Detergent compositions according to the invention may also suitably contain a bleach system. Preferably this will include a peroxy bleach compound, for example, an inorganic persalt or an organic peroxyacid, capable of yielding hydrogen peroxide in aqueous solution.

Preferred inorganic persalts are sodium perborate monohydrate and tetrahydrate, and sodium percarbonate, the latter being especially preferred. The sodium percarbonate may have a protective coating against destabilisation by moisture. The peroxy bleach compound is suitably present in an amount of from 5 to 35 wt %, preferably from 10 to 25 wt %.

The peroxy bleach compound may be used in conjunction with a bleach activator (bleach precursor) to improve bleaching action at low wash temperatures. The bleach precursor is suitably present in an amount of from 1 to 8 wt %, preferably from 2 to 5 wt %. Preferred bleach precursors are peroxycarboxylic acid precursors, more especially peracetic acid precursors and peroxybenzoic acid precursors; and peroxycarbonic acid precursors. An especially preferred bleach precursor suitable for use in the present invention is N,N,N',N'-tetracetyl ethylenediamine (TAED).

A bleach stabiliser (heavy metal sequestrant) may also be present. Suitable bleach stabilisers include ethylenediamine tetraacetate (EDTA), diethylenetriamine pentaacetate (DTPA), ethylenediamine disuccinate (EDDS), and the polyphosphonates such as the Dequests (Trade Mark), ethylenediamine tetramethylene phosphonate (EDTMP) and diethylenetriamine pentamethylene phosphate (DETPMP).

The compositions of the invention may contain alkali metal carbonate, preferably sodium carbonate, in order to increase detergency and ease processing. Sodium carbonate may suitably be present in amounts ranging from 1 to 60 wt %, preferably from 2 to 40 wt %.

As previously indicated, sodium silicate may also be present. The amount of sodium silicate may suitably range from 0.1 to 5 wt %. Sodium silicate, as previously indicated, is preferably introduced via the second base granule.

Powder flow may be improved by the incorporation of a small amount of a powder structurant. Examples of powder structurants, some of which may play other roles in the formulation as previously indicated, include, for example, fatty acids (or fatty acid soaps), sugars, acrylate or acrylate/maleate polymers, sodium silicate, and dicarboxylic acids (for example, Sokalan (Trade Mark) DCS ex BASF). One preferred powder structurant is fatty acid soap, suitably present in an amount of from 1 to 5 wt %.

Other materials that may be present in detergent compositions of the invention include antiredeposition agents such as cellulosic polymers; soil release agents; anti-dye-transfer agents; fluorescers; inorganic salts such as sodium sulphate; enzymes (proteases, lipases, amylases, cellulases); dyes; coloured speckles; perfumes; and fabric conditioning compounds. This list is not intended to be exhaustive.

Product Form and Preparation

The compositions of the invention may be of any suitable physical form, for example, particulates (powders, granules, tablets), liquids, pastes, gels or bars.

According to one especially preferred embodiment of the invention, the detergent composition is in particulate form.

Powders of low to moderate bulk density may be prepared by spray-drying a slurry, and optionally postdosing (dry-mixing) further ingredients. "Concentrated" or "compact" powders may be prepared by mixing and granulating processes, for example, using a high-speed mixer/granulator, or other non-tower processes.

Tablets may be prepared by compacting powders, especially "concentrated" powders.

Also preferred are liquid detergent compositions, which may be prepared by admixing the essential and optional ingredients in any desired order to provide compositions containing the ingredients in the requisite concentrations.

Incorporation of the Graft Copolymer

The polymers may be incorporated at any suitable stage in the manufacture of the compositions of the invention.

For example, in the manufacture of spray-dried particulate compositions, polymer in powder or solution (preferably aqueous) form may be incorporated in the slurry. For non-tower particulates, polymer powder or solution may be easily introduced into mixing and granulating apparatus, either alone or in admixture with other solid or liquid ingredients as appropriate.

EXAMPLES

The invention is further illustrated by the following Examples.

Examples 1 to 8

Preparation and Characterisation of Polymers

Polymers were prepared to the general formula below:

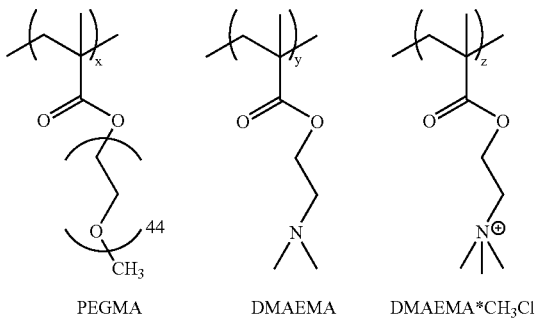

PEGMA = polyethylene glycol methacrylate
DMAEMA = 2-dimethylaminoethyl methacrylate The polymers shown in Table 1 below were prepared, the figures representing mole ratios of the monomers used:

TABLE 1

| Example | PEGMA (x) | DMAEMA (y) | Quaternised DMAEMA (z) (DMAEMA*CH₃Cl) |
|---|---|---|---|
| 1 | 95 | 5 | |
| 2 | 90 | 10 | |
| 3 | 75 | 25 | |
| 4 | 98 | | 2 |
| 5 | 95 | | 5 |
| 6 | 90 | | 10 |
| 7 | 75 | | 5 |
| 8 | 90 | 5 | 5 |

Experimental Details of Polymer Preparation

Appropriate amounts of initiator azobisisobutyronitrile (AIBN) and of the monomers PEGMA 2000 (50 wt % acqueous solution of polyethyleneglycol-2000 methyl ether methacrylate) and DMEAMA (dimethylaminoethyl-methacrylate (ex Aldrich) and/or DMAEMA*CH₃Cl (70 wt % aqueous solution of dimethylaminoethylmethacrylate methyl chloride (ex Polysciences Inc.) were placed into a glass ampoule. PEGMA-2000 was used to dose PEGMA. Isopropanol was then added in order that the resultant solution contained 30 wt % total concentration of monomers and 0.3 wt % of initiator. The reaction mixture was then flushed with a moderate flow of nitrogen gas for 15 minutes. The ampoule was subsequently sealed and placed into a water bath (60° C.). Usually, the initiator completely dissolved during the nitrogen flush however, if required, the ampoule was lightly shaken until the initiator completely dissolved. Copolymerisation was carried out for 20 hours.

After copolymerisation the ampoule was opened and the contents (quantitatively) transferred into dialysis tubing using as small amounts of distilled water as possible.

Visking Dialysis Tubing 27/32 (pore size 24 Å, exclusion limits 8000–15000 D) was used for purification of the copolymers. Usually, about 100 ml of copolymer solution was poured into the dialysis tubing, while the volume of the outer distilled water was ca 1 litre. The dialysis process was done over a period of four days under constant mixing of the outer distilled water, which was changed twice per day.

The copolymer solution from the dialysis tubing was quantitatively transferred into a round bottom 0.5–1 litre flask. Using a vacuum rotating evaporator, the solution was concentrated up to a viscous syrup. The viscous syrup (copolymer with small amount of water) was then quantitatively transferred into a Petri dish and dried at room temperature for 2–3 days up to a solid state. Finally, the copolymer was well dried in a vacuum oven at 60° C. for 24 hours.

Characterisation of the Copolymers

The chemical composition of each copolymer was determined by means of proton NMR spectroscopy. Table 2 reports the relative molar composition of the various monomers in the final copolymers. The determined compositions were in close agreement with the reaction feed ratios.

The molecular weights of the materials were determined by Gel Permeation Chromatography. The eluent used was a 0.3M $NaNO_3$+2 ml/L NaOH solution. Both Light Scattering and Refractive Index detectors were used to determine the number average (Mn) and weight average (Mw) molecular weight of each copolymer. These molecular weights are recorded in Table 2.

TABLE 2

| Example | Copolymer composition, mole % | Mn (g/mol) | Mw (g/mol) | Polydisp (Mw/Mn) |
|---|---|---|---|---|
| 1 | PEGMA:DMAEMA = 95:5 | 119 700 | 310 350 | 2.6 |
| 2 | PEGMA:DMAEMA = 90:10 | 156 750 | 491 100 | 3.1 |
| 3 | PEGMA:DMAEMA = 75:25 | 158 200 | 554 650 | 3.5 |
| 4 | PEGMA:DMAEMA*$CH_3Cl$ = 98:2 | 151 400 | 423 000 | 2.8 |
| 5 | PEGMA:DMAEMA*$CH_3Cl$ = 95:5 | 826 400 | 1 785 500 | 2.2 |
| 6 | PEGMA:DMAEMA*$CH_3Cl$ = 90:10 | 182 950 | 566 200 | 3.1 |
| 7 | PEGMA:DMAEMA*$CH_3Cl$ = 75:25 | 131 550 | 234 950 | 1.8 |
| 8 | PEGMA:DMAEMA:DMAEMA*$CH_3Cl$ = 90:5:5 | 142 900 | 540 850 | 3.9 |

Preparation of the Polymer of Example 8

Polymer example 8 was synthesised by using 24.96 g (6 mmol), 0.0524 g DMAEMA (0.333 mmol) and 0.0989 g DMAEMA*$CH_3Cl$ (0.333 mmol), 0.1314 g AIBN and 16.89 g isopropanol.

Soil Release Evaluation

Release of oily soil (dirty motor oil) from cotton was evaluated using a built laundry detergent composition having the following formulation:

| | Weight % |
|---|---|
| Linear alkylbenzene sulphonate | 23.00 |
| Cationic surfactant ($C_{12-14}$ alkyl dimethyl hydroxyethyl ammonium chloride) | 0.80 |
| Sodium tripolyphosphate | 14.50 |
| Sodium carbonate | 17.50 |
| Sodium silicate | 7.00 |
| Sodium sulphate | 28.52 |
| Sodium carboxymethyl cellulose | 0.37 |
| Fluorescers | 0.19 |
| Enzymes (protease, lipase, amylase) | 0.94 |
| Blue colour, perfume | 0.44 |
| Moisture etc | 6.92 |

Methodology

The polymers of Examples 1 to 8 were tested for soil release from white cotton fabric using an apparatus for simulating a pretreatment/soiling/wash procedure on a small scale. Using this apparatus, the fabric was pretreated with wash liquors with and without polymers according to the invention; the fabric was then soiled, and subjected to a simulated main wash procedure using wash liquors with and without polymers according to the invention.

The Apparatus

The wash apparatus used allows different liquids to be simultaneously contacted with different regions of a single sheet of fabric. The fabric sheet is clamped between an upper and lower block. The fabric sheet is sandwiched between two rubber seals. Both blocks and seals contain an 8×12 array of square cavities, which are aligned. When blocks and fabrics are clamped together, liquids placed in individual wells do not leak or bleed through to other wells, due to the pressure applied by the blocks in the regions separating the wells. The liquids are forced to flow back and forth through the fabric by means of a pneumatically actuated thin rubber membrane, which is placed between the fabrics and the lower block. Repeated flexing of the membrane away from and towards the fabrics results in fluid motion through the fabrics.

Pretreatment

A white cotton fabric was prewashed in the above apparatus. 200 μL doses of each wash solution under test were placed in appropriate wells in the washing apparatus. The liquids flowed through the fabrics for 20 minutes, at 30° C. with a flow cycle time of 1.5 seconds. After 20 minutes, the free liquid in the cells was poured off. The blocks where then separated and the fabric removed, and thoroughly rinsed for 1 minute in 200 ml demineralised water. The fabrics were allowed to dry for 24 hours.

Soiling

The dry fabric was placed on top of a 96 well polypropylene microtitre plate. 5 μL of dirty motor oil (15% weight in toluene) was dispensed from a pipette, onto the centre of each of the 96 cells on the cloth. The stained fabrics were allowed to dry at room temperature for 24 hours. Reflectance was then measured using a flatbed scanner.

Main Wash

The test fabric was then re-clamped in the washing apparatus, 200 μL doses of each wash solution were placed in appropriate wells. The liquids flowed through the fabrics for 20 minutes, at 30° C. with a flow cycle time of 1.5 seconds. After 20 minutes, the free liquid in the cells was poured off. The blocks where then separated and the fabric removed, and thoroughly rinsed for 1 minute in 200 mL demineralised water. The fabrics were allowed to dry for 24 hours. Reflectance was then measured using a flatbed scanner.

Experimental Conditions

The experiments were carried out at product doses of 1.3 and 4 g/L, in water of 0, 6 and 12 °FH, the hardness being made up of three parts calcium to 1 part magnesium.

For the prewash, the polymers were dosed at levels of 4 times the level used in the main wash (see below), and there was also a polymer-free control for each set of conditions.

For the main wash, the polymers were dosed at levels of 10, 20, 50 and 200 ppm, and there was also a polymer-free control for each set of conditions.

Results are expressed as the increase in reflectance on washing (ΔR) at 460 nm.

Polymer of Example 1

| Water hardness | Product dose | ΔR at 460 nm for polymer concentrations of | | | | |
|---|---|---|---|---|---|---|
| (° F.) | g/L | 0 | 10 ppm | 20 ppm | 50 ppm | 200 ppm |
| 0 | 1.3 | 8.94 | 11.82 | 14.27 | 11.45 | 9.27 |
| 6 | 1.3 | 9.31 | 12.92 | 15.11 | 13.23 | 11.20 |
| 12 | 1.3 | 9.47 | 12.47 | 15.58 | 14.36 | 12.83 |
| 0 | 4 | 22.89 | 32.85 | 32.75 | 29.23 | 25.36 |
| 6 | 4 | 22.81 | 33.04 | 34.42 | 29.22 | 25.53 |
| 12 | 4 | 20.59 | 32.36 | 33.91 | 29.69 | 26.00 |

Polymer of Example 4

| Water hardness | Product dose | ΔR at 460 nm for polymer concentrations of | | | | |
|---|---|---|---|---|---|---|
| (° F.) | g/L | 0 | 10 ppm | 20 ppm | 50 ppm | 200 ppm |
| 0 | 1.3 | 8.94 | 12.63 | 13.79 | 10.15 | 9.85 |
| 6 | 1.3 | 9.31 | 13.64 | 13.16 | 12.53 | 11.50 |
| 12 | 1.3 | 9.47 | 15.41 | 15.52 | 11.96 | 13.66 |
| 0 | 4 | 22.89 | 33.33 | 33.25 | 27.30 | 24.98 |
| 6 | 4 | 22.81 | 33.02 | 33.32 | 28.25 | 26.13 |
| 12 | 4 | 20.59 | 32.39 | 32.62 | 27.39 | 25.46 |

It will be seen that the highest level of polymer did not give the best results. Optimum benefit was found at levels of 10–20 ppm in the wash liquor, at both high and low product dosages.

The following table shows the results for all 8 polymers averaged over all levels (10–200 ppm), and shows that all were better than the control without polymer. As a further control, sodium carboxymethyl cellulose (SCMC) was used.

| Polymer of Example | 0° FH | 6° FH | 12° FH | 0° FH | 6° FH | 12° FH |
|---|---|---|---|---|---|---|
| | 1.3 g/L product dose | | | 4 g/L product dose | | |
| 1 | 10.02 | 12.34 | 12.97 | 27.53 | 28.17 | 28.60 |
| 2 | 10.67 | 12.23 | 14.04 | 27.07 | 27.47 | 27.43 |
| 3 | 11.52 | 12.97 | 14.30 | 27.85 | 26.59 | 26.37 |
| 4 | 10.99 | 12.56 | 13.68 | 26.92 | 27.88 | 27.45 |
| 5 | 9.42 | 11.65 | 11.63 | 26.29 | 26.32 | 25.76 |
| 6 | 8.96 | 11.89 | 13.42 | 26.50 | 26.48 | 25.35 |
| 7 | 8.03 | 10.92 | 10.67 | 24.36 | 23.28 | 23.50 |
| 8 | 9.42 | 11.54 | 13.27 | 27.29 | 27.10 | 26.65 |
| No polymer | 8.22 | 9.90 | 10.15 | 25.21 | 24.69 | 23.26 |
| SCMC | 8.11 | 10.34 | 11.89 | 25.66 | 24.61 | 24.21 |

What is claimed is:

1. A graft copolymer having a number average molecular weight of at least 10 000 comprising:
   (a) backbone units derived from an ethylenically unsaturated carboxylate monomer,
   (b) hydrophilic uncharged side chains, which are polyethylene oxide chains comprising at least 10 polyethylene oxide units and
   (c) from 1 to 30 mole % ethylenically unsaturated monomer containing an aliphatic or aromatic moiety which contains a tertiary or quaternary nitrogen atom.

2. A graft copolymer as claimed in claim 1, characterised in that the backbone units (a) are methacrylate units.

3. A graft copolymer as claimed in claim 1 characterised in that the polyethylene oxide chains comprise at least 30 polyethylene oxide units.

4. A graft copolymer as claimed in claim 1, wherein the units (c) are units of a tertiary amine acrylate or methacrylate which may optionally be wholly or partially quaternised.

5. A graft copolymer as claimed in claim 4, wherein the units (c) are units of 2-dimethylaminoethyl methacrylate (DMAEMA) which may optionally be wholly or partially quaternised.

6. A graft copolymer as claimed in claim 1, which comprises:
   (a) backbone units of methacrylate,
   (b) polyethylene oxide side chains, and
   (c) side chains of dimethylaminoethylmethacrylate (DMAEMA) which may optionally be wholly or partially quaternised.

7. A graft copolymer as claimed in claim 6, which comprises from 70 to 99 mole %, in total, of the units (a) and (b), and from 1 to 30 mole % of the units (c).

8. A graft copolymer as claimed in claim 1, having a a number average molecular weight of at least 10 000, preferably from 50 000 to 1 000 000, more preferably from 100 000 to 500 000, and a weight average molecular weight of at least 20 000, preferably from 100 000 to 2 000 000, more preferably from 200 000 to 1 000 000.

9. A process for the preparation of a graft polymer as claimed in claim 1, which comprises reacting
   (i) a copolymer having backbone units derived from an ethylenically unsaturated monomer and hydrophilic uncharged side chains with
   (ii) a monomer containing cationically chargeable or charged side chains containing a tertiary or quaternary nitrogen atom, in the presence of a free radical initiator.

10. A process as claimed in claim 9, which comprises reacting polyethylene glycol methyl ether methacrylate (PEGMA) with a tertiary amine acrylate or methacrylate which may optionally be wholly or partially quaternised.

11. A process as claimed in claim 9, which comprises reacting PEGMA with 2-dimethylaminoethyl methacrylate (DMAEMA), optionally in wholly or partly quaternised form.

12. A laundry detergent composition comprising an organic detergent surfactant, and a graft copolymer as claimed in claim 1 in an amount effective to improve soil release.

13. A detergent composition as claimed in claim 12, which contains from 0.1 to 10 wt %, preferably from 0.25 to 5 wt %, of the graft copolymer.

14. A detergent composition as claimed in claim 12 which comprises:
- (a) from 5 to 60 wt %, preferably from 10 to 40 wt %, of organic detergent surfactant,
- (b) optionally from 5 to 80 wt %, preferably from 10 to 60 wt %, of detergency builder,
- (c) from 0.1 to 10 wt %, preferably from 0.25 to 5 wt %, of the graft copolymer, and
- (d) optionally other detergent ingredients to 100 wt %.

15. A method of promoting soil release during laundering of a textile fabric, characterised in that the method comprises contacting the fabric with a graft copolymer as claimed in claim 1, and subsequently washing the fabric after wear or use of the fabric.

* * * * *